United States Patent [19]

Coleman et al.

[11] Patent Number: 4,857,407
[45] Date of Patent: Aug. 15, 1989

[54] LOW MODULUS INTERLAYER

[75] Inventors: Charles R. Coleman, Pittsburgh; Thomas G. Rukavina, Lower Burrell, both of Pa.

[73] Assignee: PPG Industries, Inc., Pittsburgh, Pa.

[21] Appl. No.: 62,757

[22] Filed: Jun. 16, 1987

[51] Int. Cl.$^4$ ............................................. B32B 27/36
[52] U.S. Cl. .................. 428/412; 428/423.3; 428/425.6
[58] Field of Search ............... 428/423.3, 425.6, 412

[56] References Cited

U.S. PATENT DOCUMENTS

| 3,388,032 | 6/1968 | Saunders | 428/412 |
|---|---|---|---|
| 3,764,457 | 10/1973 | Chang et al. | 161/183 |
| 3,931,113 | 1/1976 | Seeger et al. | 260/75 |
| 4,024,113 | 5/1977 | Ammons | 428/425.6 |
| 4,131,605 | 12/1978 | Ammons | 528/77 |
| 4,131,606 | 12/1978 | Ammons | 528/58 |
| 4,241,140 | 12/1980 | Ammons | 428/339 |
| 4,592,947 | 6/1986 | Hunter et al. | 428/412 |
| 4,652,494 | 3/1987 | Bravet et al. | 428/412 |
| 4,671,838 | 6/1987 | Brafet et al. | 428/412 |
| 4,705,721 | 11/1987 | Frisch et al. | 428/412 |
| 4,731,289 | 3/1988 | Coleman | 428/412 |

*Primary Examiner*—Edith Buffalow
*Attorney, Agent, or Firm*—Donna L. Seidel

[57] ABSTRACT

A low shear modulus thermoplastic polyurethane useful in laminating rigid plies with different coefficients of thermal expansion without warpage is disclosed, along with laminates comprising said low modulus interlayer.

10 Claims, No Drawings

LOW MODULUS INTERLAYER

BACKGROUND

The invention relates generally to the art of polyurethanes for use in laminated transparencies, and more particularly to the art of thermoplastic polyurethanes for use as interlayers.

Safety glass is a well known term for a glass sandwich composed of an interlayer bonding together two glass plates or sheets so that breaking the glass results in minimum dispersion of broken glass fragments. These laminated glasses are widely used in automobiles, and the interlayer must possess a number of properties, among which are: (1) high impact energy absorption to minimize concussive injury; (2) shear and tear strength sufficient to prevent rupture of the interlayer by the broken glass; (3) sufficient adhesion to the glass to inhibit laceration on contact with and prevent dispersion of broken glass and (4) good optical quality. Moreover, safety glass laminates must possess these properties over a wide temperature range in which these materials are employed.

It has been discovered that bilayer and multiple-layer laminates of one or more sheets of glass and particular urethane polymers can be employed to provide safety glass which is impact-resistant over a wide temperature range, minimizes lacerative injury and is superior to safety glass using polyvinyl butyral interlayers.

U.S. Pat. No. 3,764,457 to Chang et al discloses safety glass laminates comprising a thermoplastic polyurethane sheet prepared from an aliphatic polycarbonate, a cycloaliphatic diisocyanate and a monomeric aliphatic diol.

U.S. Pat. No. 3,931,113 to Seeger et al discloses polyester urethanes for use in safety glass laminates which are formed from a cycloaliphatic diisocyanate, a low molecular weight diol, and a hydroxy-terminated polyester of polycaprolactone, poly(butyleneladipate), poly(butylenelazelate) or mixtures thereof.

U.S. Pat. No. 4,131,605 to Ammons discloses a transparent elastomeric polyurethane which may be cast and cured in place at ambient temperature prepared by the reaction of a cycloaliphatic diisocyanate with a polyalkylene ether glycol and a crosslinking agent in the presence of butyl stannoic acid catalyst.

U.S. Pat. No. 4,131,606 to Ammons discloses a transparent elastomeric polyurethane which may be cast and cured in place at ambient or slightly elevated temperatures prepared from a homogeneous colorless liquid reaction mixture of a polycaprolactone polyol, a cycloaliphatic diisocyanate and butyl stannoic acid catalyst.

U.S. Pat. No. 4,241,140 to Ammons discloses a transparent elastomeric polyurethane useful as an interlayer in safety glass laminates prepared by the reaction of an aromatic diisocyanate with a mixture of a polyalkylene ether glycol, a polycaprolactone triol and a monomeric aliphatic diol.

While the above described polyurethane interlayers are effective energy-absorbing, impact-resistant materials for laminating glass to glass, a thermoplastic interlayer which facilitates lamination of rigid plies with different coefficients of thermal expansion is needed for laminating materials such as polycarbonate or acrylic and glass for use in aircraft windshields and other transparencies.

SUMMARY OF THE INVENTION

The present invention provides a thermoplastic polyurethane with a low shear modulus which allows for lamination at high temperatures of glass and plastics with incompatible coefficients of thermal expansion without creating severe stresses or distortions in the contour of the laminated article. The low modulus interlayer of the present invention is a polyurethane with sufficiently high urethane content to prevent crystallinity at low temperatures and sufficiently "soft" hard segment to permit lamination of rigid plies with different coefficients of thermal expansion at elevated temperature without warpage of the laminate as it returns to ambient temperature.

DETAILED DESCRIPTION OF THE PREFERRED EMBODIMENTS

Large differences in the coefficients of thermal expansion between substrates such as glass and rigid plastics such as polycarbonate or acrylic make it difficult to fabricate laminates without stress. Generally, contour distortions, as well as crazing of the plastic, result. Low temperature lamination or casting and curing in place may be carried out to alleviate stress, but these alternative processes may not provide adequate adhesion within the laminate. These problems are solved in accordance with the present invention by means of an interlayer with a lower shear modulus which prevents accumulation of stress in a laminate. Such an interlayer permits high temperature lamination of materials with otherwise incompatible coefficients of thermal expansion, without warpage of the laminate as it cools to ambient temperature.

The low modulus polyurethane interlayer of the present invention is formulated from a hydroxy-terminated polymer, preferably a low molecular weight polyester or polyether diol, an aliphatic diisocyanate and a monomeric aliphatic diol having at least a five member chain which reacts with the diisocyanate to form a relatively "soft" hard segment, i.e. a hard segment which provides a polyurethane with a lower softening point than polyurethanes incorporating the standard 1,4 butanediol. The low modulus polyurethane of the present invention has a sufficiently high urethane content to avoid crystallinity at low temperature, and sufficiently "soft" hard segment to permit lamination of rigid plies having different coefficients of thermal expansion at elevated temperature, typically above 140° F. (about 60° C), without warpage of the laminate as it cools to ambient temperature.

The low modulus polyurethane interlayer of the present invention is preferably formulated from a polyester or polyether diol having a molecular weight between about 500 and 2000. Polycaprolactone diol is a suitable polyester. Polyalkalene ether diols are preferred polyethers; polytetramethylene ether diol is particularly preferred.

The relatively "soft" hard segment of the low modulus polyurethanes of the present invention are preferably formed from diols which react with diisocyanate to form polyurethanes with lower softening temperatures compared with those formed from 1,4 butanediol; such as 1,6 hexanediol, diethylene glycol and thiodiethanol. Most preferred is 1,5 pentanediol, which yields polyurethanes with higher percent elongation and lower modulus than the above, apparently because the odd number carbon hard segment is nonreinforcing.

Diisocyanates useful in preparing the low modulus interlayers of the present invention include 4,4'-methylene-bis-(cyclohexyl diisocyanate); hydrogenated toluene diisocyanate; 4,4'-isopropylidene-bis-(cyclohexyl isocyanate); 1,4-cyclohexyl diisocyanate; 4,4'dicyclohexl diisocyanate; 2,2,4-trimethylhexamethylene diisocyanate (TMDI); and 3-isocyanato methyl-3,3,3-trimethylcyclohexyl diisocyanate (IPDI). Mixtures can be employed to include minor amounts of other diisocyanates, such as toluene diisocyanate (TDI), diphenyl methane diisocyanate (MDI) and other aromatic diisocyanates, providing that the amount employed is carefully controlled to avoid yellowing, translucence, and reduced impact resistance.

The most preferred cycloaliphatic diisocyanate is 4,4' methylene bis(cyclohexylisocyanate). The product sold by du Pont under the name "Hylene W" has a stereoisomer content of 19 to 21 percent trans, trans; 17 to 18 percent cis, cis; and 62 to 64 percent cis, trans. The total ratio is 55 percent trans and 45 percent cis. The diisocyanate may also contain a minor amount of monoisocyanate, such as between about 0.27 and 0.40 percent, and has a total acidity (as HCl) between about 0.001 and 0.002 percent by weight and an isocyanate content of about 99.8 percent of the theoretical. The preferred 4,4' methylene bis(cyclohexylisocyanate) is currently available from Bayer under the name "Desmodur W". In the most preferred compositions of the invention, the monomeric diol reacted with this diisocyanate and polyol is 1,5-pentanediol.

The low modulus polyurethanes useful as interlayers in accordance with the present invention typically have a weight average molecular weight in the range of 65,000 to 255,000; preferably in the range of 150,000 to 180,000. The urethane content may range from 10 to 16 percent, depending on the reactants, and is preferably in the range of 12 to 14 percent. Using the preferred 1,5 pentanediol for the hard segment, the most preferred urethane content is about 12.5 percent.

The low modulus polyurethane interlayers of the present invention may be produced in accordance with polyurethane reactions well known in the art, including both one-shot and prepolymer syntheses. Various known catalysts may be used; stannous octoate is preferred. The bulk polymer is preferably extruded into sheet form for use in laminates in accordance with the present invention. The low modulus interlayer of the present invention is useful in laminating glass with a variety of polymers such as polycarbonate, acrylic and hard polyurethanes, as well as in laminating polymers to other polymers, such as acrylic to polycarbonate, without warpage.

To measure the effectiveness of the low modulus polyurethanes of the present invention, laminates are prepared and their warpage measured as follows. A piece of glass measuring 6 by 40 inches (about 0.15 by 1 meter) and ⅛ inch (about 3 millimeters) thick is treated with a silane primer on one surface and matched with a 6 by 40 by ¼ inch (0.15 by 1 meter by 6 millimeter) piece of polycarbonate. A 6 by 40 by ⅛ inch sheet of low modulus polyurethane is placed between the primed glass surface and the polycarbonate. The assembled plies are placed in an autoclave at 210° F. (about 99° C.) and 200 pounds per square inch pressure for 90 minutes to form a laminate. The laminate sample is placed on a flat surface and allowed to cool to 25° C. The warpage is measured as the center deflection, i.e., the distance from the flat surface to the center of the laminate.

The present invention will be further understood from the descriptions of specific examples which follow.

EXAMPLE I

A low shear modulus polyurethane is prepared by reacting 1000 molecular weight polytetramethylene ether glycol with 4,4' methylene bis(cyclohexylisocyanate) using diethylene glycol to form the hard segment. The polyurethane is laminated between ⅛ inch (about 3 millimeter) thick glass and ¼ inch (about 6 millimeter) thick polycarbonate to form a 6 by 40 inch (0.15 by 1.0 meter) laminated beam sample. The center deflection of this example is 0.02 inch (about 0.5 millimeter) indicating a good low modulus interlayer.

EXAMPLE II

A low modulus polyurethane composition is formulated as in Example I, except that thiodiethanol is used to form the hard segment to improve oxidative stability. The composition is prepared from 318.9 grams of polytetramethylene ether glycol, 22.1 grams of thiodiethanol and 131 grams of diisocyanate. The polyurethane contains 14.7 percent hard segment, 17.3 percent cyclic content and 12.5 percent urethane content.

EXAMPLE III

A low modulus polyurethane composition is prepared by reacting 0.8 equivalent of 520 molecular weight polycaprolactone diol with 1.0 equivalent of 4,4' methylenebis(cyclohexylisocyanate) using 0.2 equivalent of 1,6 hexanediol to form the hard segment. The resulting polyurethane has a urethane content of 16.4 percent, 10.6 percent hard segment and a durometer of Shore A 70. Strips of polymer 2 by 12 inches (about 5 by 30 centimeters) and 0.08 inch (about 2 millimeters) thick are laminated between ¼ inch (about 6 millimeter) glass and 3/16 inch (about 4.8 millimeter) polycarbonate at 230° F. (about 110° C.). Center deflection of 0.10 inch (about 0.25 millimeter) compares favorably with center deflection of 0.03 inch (about 0.76 millimeter) for a control laminate using a 0.09 inch (about 2.3 millimeters) thick polyurethane prepared from the same diisocyanate, a 2000 molecular weight polybutylene adipate diol and 1,4 butanediol, and having a urethane content of 12.3 percent and 25 percent hard segment, as disclosed in U.S. Pat. No. 3,931,113 to Seeger et al.

EXAMPLE IV

A low modulus polyurethane is prepared by reacting one equivalent of 4,4' methylene bis(cyclohexylisocyanate) with 0.56 equivalent of 1000 molecular weight polytetramethylene ether glycol and 0.44 equivalent of diethylene glycol to form the hard segment. The polyurethane is laminated between glass and poloycarbonate as in the previous example. At an interlayer thickness of 0.038 inch (about 1 millimeter), the center deflection is 0.069 inch (about 1.8 millimeters). At an interlayer thickness of 0.063 inch (about 1.6 millimeters), the center deflection is only 0.03 inch (about 0.8 millimeters). For comparison, a glass/polycarbonate laminate with an interlayer of the control Polyurethane of the previous example is 0.124 inch (about 3.15 millimeters) for an interlayer thickness of 0.058 inch (about 1.5 millimeters).

EXAMPLE V

A low modulus polyurethane composition is prepared by reacting 1000 molecular weight polytetramethylene ether glycol with 4,4' methylene bis(cyclohexyldiisocyanate) using 1,5 pentanediol as the hard segment. The urethane content, weight percent hard segment, weight percent cyclic content, and mole percent excess diisocyanate are varied in a series of experiments designed to optimize the properties of the polymer.

A Box-Behnken response surface design is chosen for the low modulus interlayer experiments because it supports a full quadratic model and provides information regarding linear, interaction and curvature effects with respect to the continuous independent variables. Thus, responses over the entire factor space can be seen, and predictive models can be constructed. A three-variable, three-level design is used in this experiment for a total of 15 samples with three duplicate center points. All experiments are randomized. The independent variables, listed in Table I, are urethane content, mole percent excess diisocyanate, and catalyst concentration. Mole percent excess diisocyanate is chosen as an independent variable in order to control the molecular weight, since the theoretical mole ratio of diisocyanate to polyols of one is not attained. The catalyst concentration is chosen as an independent variable since it partly controls the degree of polymerization. Urethane content is varied from 10 to 14 percent because it is suspected from previous exploratory work that material outside this range would not be useful as an interlayer for glass/plastic transparencies. The catalyst (butylstannoic acid) concentration is varied from 200 to 1000 parts per million. The mole percent excess diisocyanate is varied from 0 to 6 percent. The isocyanate used in all 15 formulations is 4,4' methylene bis(cyclohexylisocyanate). The polyol is polytetramethylene ether glycol of 1000 molecular weight, available as Teracol 1000 from du Pont, and the pentanediol is obtained from Aldrich. All polyurethane interlayers are cured at 175° F. (about 79° C.) for 48 hours.

The polyurethane formulations are shown in Table I, the physical properties of these polyurethanes are summarized in Table II, and the thermal properties of the polyurethane interlayers are listed in Table III. The glass transition temperature is the temperature above which a rigid glassy polymer becomes a rubbery polymer. The center deflection is measured as described herein.

TABLE I

LOW MODULUS INTERLAYER FORMULATIONS

| Sample No. | Urethane Content (Weight %) | Catalyst Concentration (parts per million) | Excess Isocyanate (Mole %) | Hard Segment (Weight %) | Cyclic Content (weight %) |
| --- | --- | --- | --- | --- | --- |
| 1 | 14 | 600 | 6.4 | 20.7 | 19.4 |
| 2 | 14 | 600 | 0 | 20.7 | 19.4 |
| 3 | 10 | 600 | 5.98 | 3.3 | 13.8 |
| 4 | 10 | 600 | 0 | 3.3 | 13.8 |
| 5 | 14 | 200 | 2.98 | 20.7 | 19.4 |
| 6 | 14 | 200 | 5.06 | 20.7 | 19.4 |
| 7 | 10 | 1000 | 2.99 | 3.3 | 13.8 |
| 8 | 10 | 200 | 2.99 | 3.3 | 13.8 |
| 9 | 12 | 1000 | 5.97 | 12 | 16.7 |
| 10 | 12 | 200 | 5.99 | 12 | 16.7 |
| 11 | 12 | 1000 | 0 | 12 | 16.7 |
| 12 | 12 | 200 | 0 | 12 | 16.7 |
| 13 | 12 | 600 | 3.02 | 12 | 16.7 |
| 14 | 12 | 600 | 3.02 | 12 | 16.7 |
| 15 | 12 | 600 | 3.02 | 12 | 16.7 |

TABLE II

LOW MODULUS INTERLAYER PROPERTIES

| Sample No. | Molecular Weight (Weight Average) | Molecular Weight (Number Average) | Durometer (Shore A) | Tensile Strength (pounds per square inch) | Elongation (%) |
| --- | --- | --- | --- | --- | --- |
| 1 | 129881 | 36987 | 76 | 2678 | 418 |
| 2 | 81464 | 32302 | 65 | 1089 | 660 |
| 3 | 218206 | 58310 | 59 | 198 | 1102 |
| 4 | 85864 | 31964 | 31 | | |
| 5 | 170541 | 52807 | 72 | 1890 | 503 |
| 6 | 237280 | 70599 | 66 | 1909 | 334 |
| 7 | 95745 | 38902 | 42 | | |
| 8 | 115534 | 44108 | 50 | | |
| 9 | 184112 | 47239 | 63 | 489 | 544 |
| 10 | 255125 | 80652 | 62 | 976 | 577 |
| 11 | 77298 | 29007 | 52 | 250 | 1173 |
| 12 | 80237 | 35264 | 52 | 58 | 833 |
| 13 | 158924 | 43901 | 60 | 494 | 706 |
| 14 | 120448 | 44832 | 62 | 116 | 1093 |
| 15 | 149261 | 42138 | 63 | 412 | 787 |

TABLE III

LOW MODULUS INTERLAYER THERMAL PROPERTIES

| Sample No. | Glass Transition Temperature (°C.) | Melt Index (grams/minute) | Center Deflection (inches) |
| --- | --- | --- | --- |
| 1 | −5 | 0.414 | 0.28 |
| 2 | −4 | 2.89 | 0 |
| 3 | −40 | 3.6 | 0.005 |
| 4 | −42 | 8.88 | 0.02 |
| 5 | −7 | 0.2 | 0.6 |
| 6 | −5 | 0.026 | 0.58 |
| 7 | −42 | 2.47 | 0.005 |
| 8 | −44 | 4.5 | 0 |
| 9 | −27 | 0.158 | 0.04 |
| 10 | −24 | 0.034 | 0.075 |
| 11 | −29 | 0.432 | 0 |
| 12 | −29 | 9.02 | 0.01 |
| 13 | −29 | 0.488 | 0 |
| 14 | −28 | 0.81 | 0 |
| 15 | −29 | 1.35 | 0 |

The above examples illustrate the present invention, the scope of which is defined by the following claims.

We claim:

1. A laminated article comprising two rigid plies wherein the difference between the coefficients of thermal expansion of the two plies is sufficiently great that a flat laminate comprising said plies becomes warped as said laminate cools from a laminating temperature greater than 140° F. to ambient temperature, further comprising between said rigid plies a thermoplastic polyurethane interlayer having a sufficiently low shear modulus to reduce warpage, said polyurethane being the reaction product of a cycloaliphatic diisocyanate, a hydroxy-terminated polymer and a monomeric aliphatic diol selected from the group consisting of diethylene glycol, 1,6-hexanediol, thiodiethanol and 1,5-pentanediol.

2. A laminated article according to claim 1, wherein one rigid ply is glass.

3. A laminated article according to claim 2, wherein the other rigid ply is selected from the group consisting of polycarbonate, acrylic and polyurethane.

4. A laminated article according to claim 1, wherein said polyurethane is a reaction product of 1,4-methylene biscyclohexylisocyanate, a polyester diol and a monomeric aliphatic diol selected from the group consisting of diethylene glycol, 1,5 pentanediol and 1,6-hexanediol.

5. A laminated article according to claim 1, wherein said polyurethane is a reaction product of 1,4-methylene biscyclohexylisocyanate, a polyether diol and a monomeric aliphatic diol selected from the group consisting of diethylene glycol, thiodiethanol and 1,5-pentanediol.

6. A laminated article according to claim 5, wherein said Polyether diol is polytetramethylene ether diol.

7. A laminated article according to claim 6, wherein said polytetramethylene ether diol has a molecular weight between about 500 and about 2000.

8. A laminated article according to claim 7, wherein said polytetramethylene ether diol has a molecular weight of about 1000.

9. A laminated article according to claim 8, wherein said monomeric aliphatic diol is 1,5-pentanediol.

10. A laminated article according to claim 9, wherein said polyurethane is a reaction product of said diisocyanate with about 0.6 to 0.8 equivalents of polymeric diol and 0.4 to 0.2 equivalents of monomeric diol.

* * * * *